United States Patent
Ho et al.

(10) Patent No.: US 7,333,327 B1
(45) Date of Patent: Feb. 19, 2008

(54) NOTEBOOK COMPUTER SUPPORT SEAT WHICH CAN BE CONVENIENTLY FOLDED AND CARRIED

(75) Inventors: Chi-Pei Ho, Hsi Chih (TW); Chi-Dou Ho, Hsi Chih (TW)

(73) Assignee: Aidma Enterprise Co., Ltd., Hsi Chih (TW)

( * ) Notice: Subject to any disclaimer, the term of this patent is extended or adjusted under 35 U.S.C. 154(b) by 33 days.

(21) Appl. No.: 11/498,569

(22) Filed: Aug. 3, 2006

(51) Int. Cl.
*G06F 1/16* (2006.01)

(52) U.S. Cl. ............... 361/683; 206/320; 455/557; 345/156

(58) Field of Classification Search ............... 455/15, 455/557, 41.2; 206/320, 576; 345/156, 345/184; 361/679–682, 724–727
See application file for complete search history.

(56) References Cited

U.S. PATENT DOCUMENTS

| | | | | |
|---|---|---|---|---|
| 5,555,614 | A * | 9/1996 | Book | 29/401.1 |
| 6,105,764 | A * | 8/2000 | Scicluna et al. | 206/320 |
| 6,871,739 | B2 * | 3/2005 | Lopez | 206/320 |
| 2004/0240164 | A1 * | 12/2004 | Lee | 361/683 |
| 2006/0037987 | A1 * | 2/2006 | Lin | 224/646 |

* cited by examiner

*Primary Examiner*—Hung Van Duong
(74) *Attorney, Agent, or Firm*—Pre-Techtor Int'l Services

(57) ABSTRACT

A notebook computer support seat which can be conveniently folded and carried is the support seat which is made by lightweight but stiff aluminum plates pivoted by hinges. A support arm on a base plate can be reversely inserted into an insertion hole of a front plate, projected support pieces can support the notebook computer, and insertion blocks at a tail end of a support plate or another coaxial inner support plate can be inserted into any set of insertion holes of the base plate according to an angle required by a user. The present invention can be folded into a plane shape, to facilitate being placed in a suitcase with the notebook computer, for carrying.

9 Claims, 3 Drawing Sheets

NOTEBOOK COMPUTER SUPPORT SEAT WHICH CAN BE CONVENIENTLY FOLDED AND CARRIED

BACKGROUND OF THE INVENTION a) Field of the Invention

The present invention relates to a notebook computer support seat which can be conveniently folded and carried, and more particularly to a kind of light and thin support seat which can be folded into a plane shape to facilitate being emplaced in a dedicated suitcase with a notebook computer, and which can be used to safely place the notebook computer only by reversely inserting a support arm into an insertion hole of a front plate and then putting up a support plate, when it is to be used.

b) Description of the Prior Art

In using a notebook computer normally, the notebook computer is evenly placed on a desktop most of the time, which is not ergonomic to a user in that a long time of operation will easily cause the user to be aching all over his or her body, and can even cause a harm to spine.

Accordingly, there are vendors who have developed all kinds of notebook computer support racks to support the notebook computers. However, the common drawbacks of these support racks are that their volumes are huge, their prices are expensive, and they cannot be folded into a plane shape, so as to be placed in a suitcase with the notebook computer, for carrying.

SUMMARY OF THE INVENTION

The primary object of present invention is to provide a support seat which can be folded into a plane shape to be placed in a suitcase with a notebook computer. For the lightweight but stiff support seat, a support arm which is pivoted on a base plate is reversely inserted into a through-hole of a front plate, and according to a change of position of a projected support plate or another coaxial inner support plate in plural sets of insertion-hole on the base plate, its projected area is also changed, so as to safely fix the notebook computer. The ergonomic support seat is provided with a simple structure and a cheap cost, and can be easily folded and carried personally.

Another object of the present invention to pivot a turntable at a bottom of the base plate, such that the support seat can be rotated at 360 degrees; enabling a screen of notebook computer to be rotated to a front of a client.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
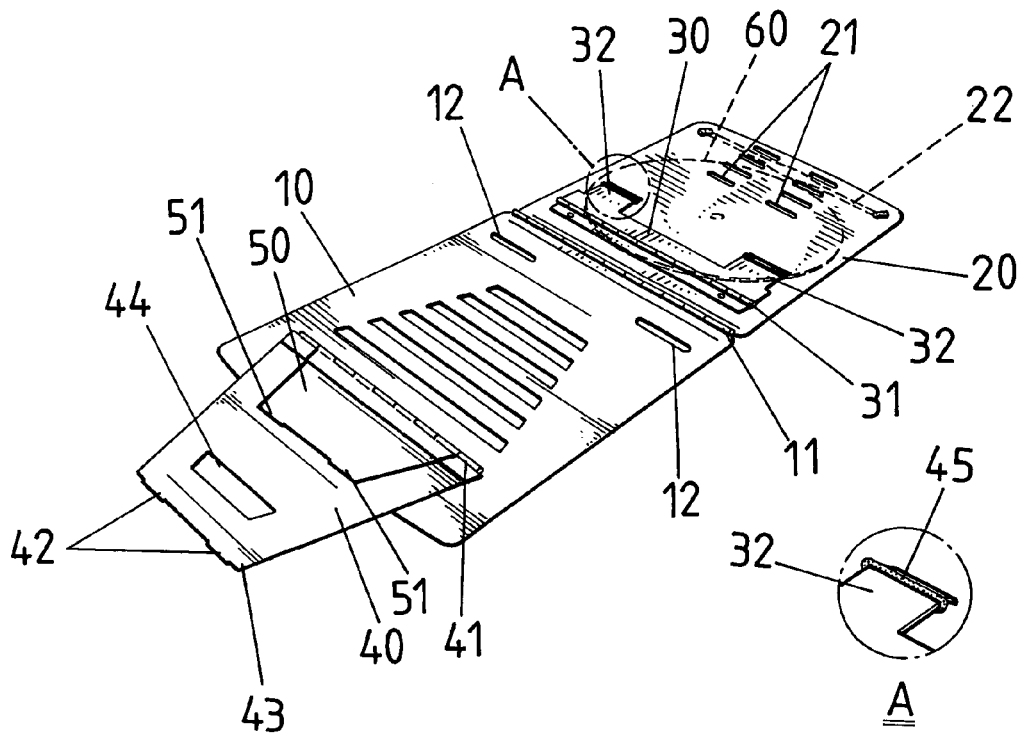
FIG. 1 shows an expanded view of the present invention.
Figure 2:
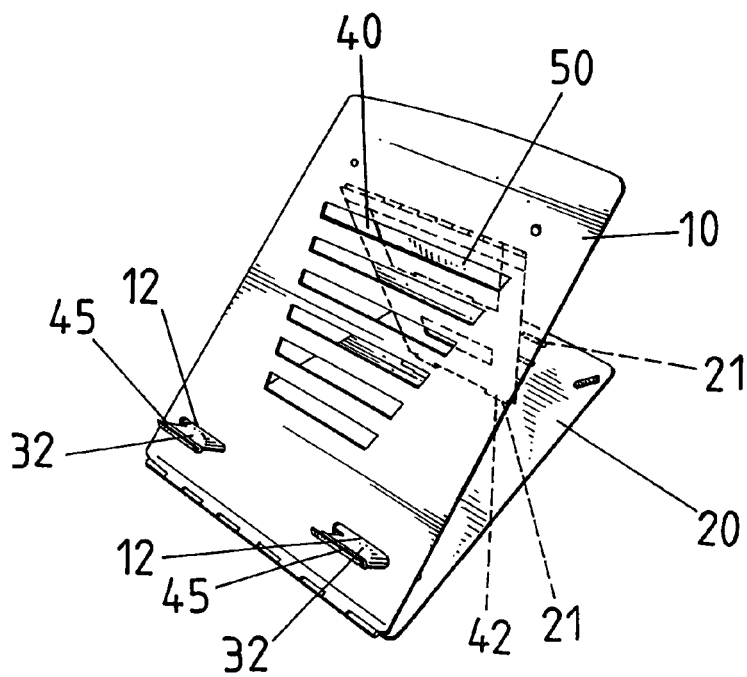
FIG. 2 shows a schematic view of the present invention after being put up.
Figure 5:
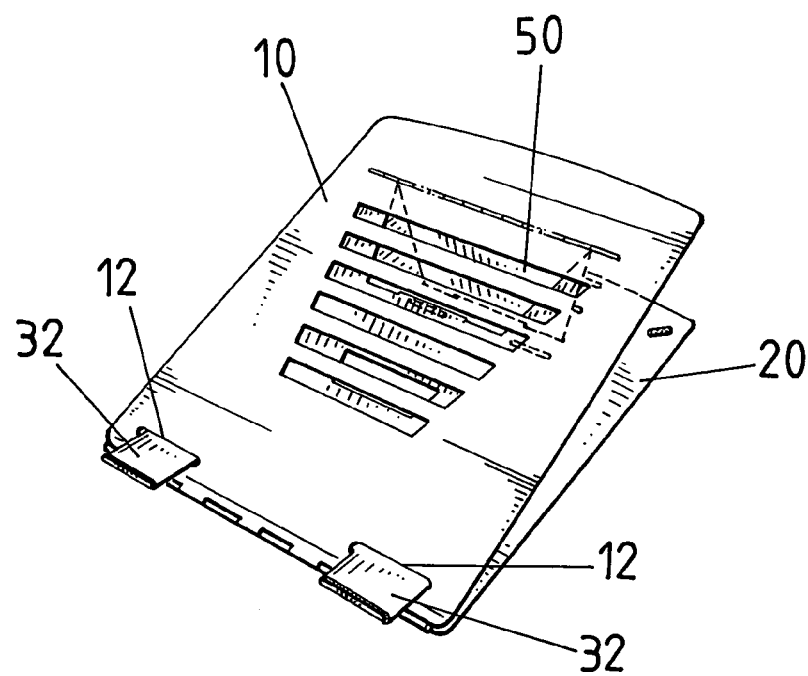
FIG. 5 shows a schematic view of an other embodiment of the present invention.

Referring to FIG. 1 and FIG. 2, the present invention comprises a front plate 10, a base plate 20, a support arm 30, and a support plate 40, wherein the front plate 10 is pivoted with the base plate 20 by a hinge 11, the support arm 30 is pivoted on the base plate 20 by a hinge 31, and the support plate 40 is pivoted at a back of the front plate 10 by a hinge 41; two through-holes 12 are located on the front plate 10 at positions close to the hinge 11, support pieces 32 at two sides of the support arm 30 can be transfixed into the through-holes 12 of front plate 10, respectively; and the base plate 20 is provided with a plurality of rows of insertion holes 21 with two parallel insertion holes as a set for forming four sets, whereas a tail end of the support plate 40 is provided with two insertion blocks 42 which can be inserted into any set of insertion holes 21 of the base plate 20 to be positioned. At an inner side of the support plate 40, two insertion blocks 51 are also located at a bottom of another inner support plate 50 which is coaxial with the support plate 40. The two insertion blocks 51 can be inserted into any set of insertion holes 21 of the base plate 20, to decrease a tilting angle (as shown in FIG. 5) of the front plate 10, which means to decrease an angle of emplacement of the notebook computer for facilitating an user to put both hands horizontally on a desktop to operate the notebook computer.

Figure 3:
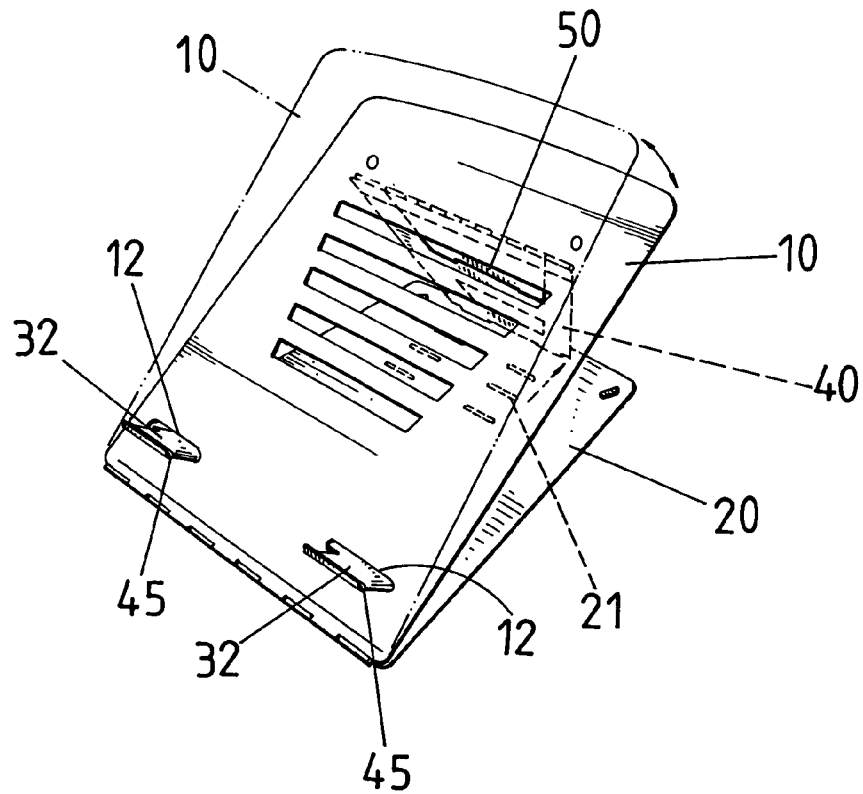
FIG. 3 shows a schematic view of an embodiment of the present invention.

Referring to FIG. 3, a notebook computer can be placed on the support pieces 32 which are reversely inserted. When front or rear positions of insertion of the two insertion blocks 42 of support plate 40 into the two insertion holes 21 of base plate 20 are changed, areas of the support pieces 32 that are protruded at an exterior of the front plate 10 are changed, and a tilt angle of the front plate 10 is also changed, such that an angle of placing the notebook computer is varied accordingly. When an elevation angle of tilt of the front plate 10 is getting larger, an included angle between the support plate 40 and the front plate 10 (or the notebook computer) is getting smaller, and the protruded areas of support pieces 32 are getting smaller, thereby safely tightening the notebook computer.

Figure 4:
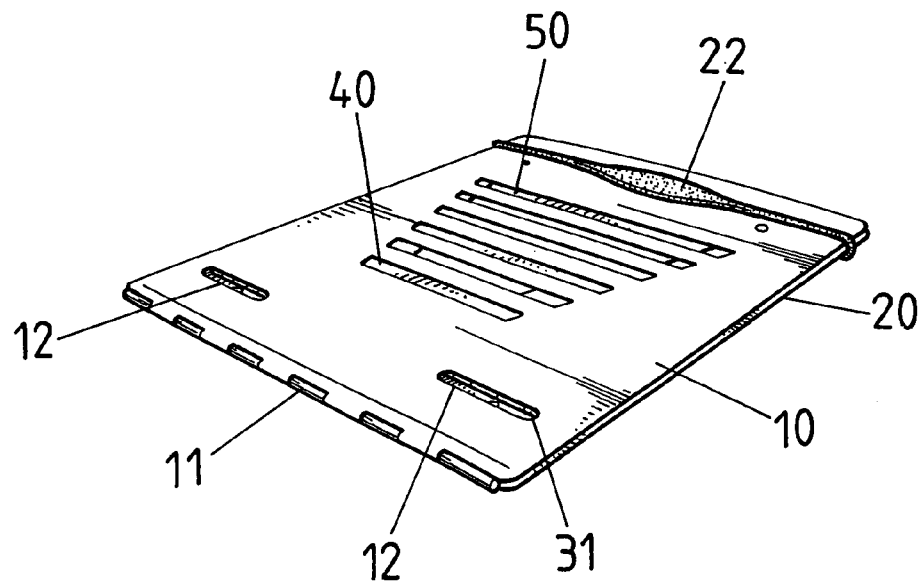
FIG. 4 shows a schematic view of the present invention after being folded.

Referring to FIG. 4, the present invention can be folded into a plane shape to facilitate being placed in a suitcase with the notebook computer, for carrying, wherein an elastic tightening rope 22 on the base plate 20 can sheath the front plate 10 to prevent it from being loosened, such that it can be carried like a loose-leaf book. When wings 43 (as shown in FIG. 1) at sides of the two insertion blocks 42 of support plate 40 are laid in flat, they can be abutted on inner sides of the two support pieces 32 of support arm 30, to prevent the support arm 30 from jumping. Whereas, when the present invention is unfolded, the tightening rope 22 is laid in flat on the base plate 20 to serve as a slide-proof cushion, so as to prevent the support seat from sliding on a desktop.

Moreover, the support plate 40 is provided with two notches 44. In using the present invention, the notches 44 can provide for a transfixing of transmission lines for input and output, to facilitate a collection. In addition, an outer rim of the projected support piece 32 can be sheathed with an oil seal ring 45 made by a rubber material. When an elevation angle of placing of the notebook computer is higher, the oil seal rings 45 can prevent the notebook computer from sliding down, and can prevent its casing from being scratched. The plates used in the present invention can be made by a lightweight but stiff aluminum plate, which is easy to carry, and can even lower a cost.

Accordingly, the present invention provides the handy support seat that is in compliance with the ergonomics. In addition to safely and firmly supporting the notebook computer, the support seat can be folded into a plane shape, to facilitate being placed in a suitcase with the notebook computer, for carrying.

Figure 6:
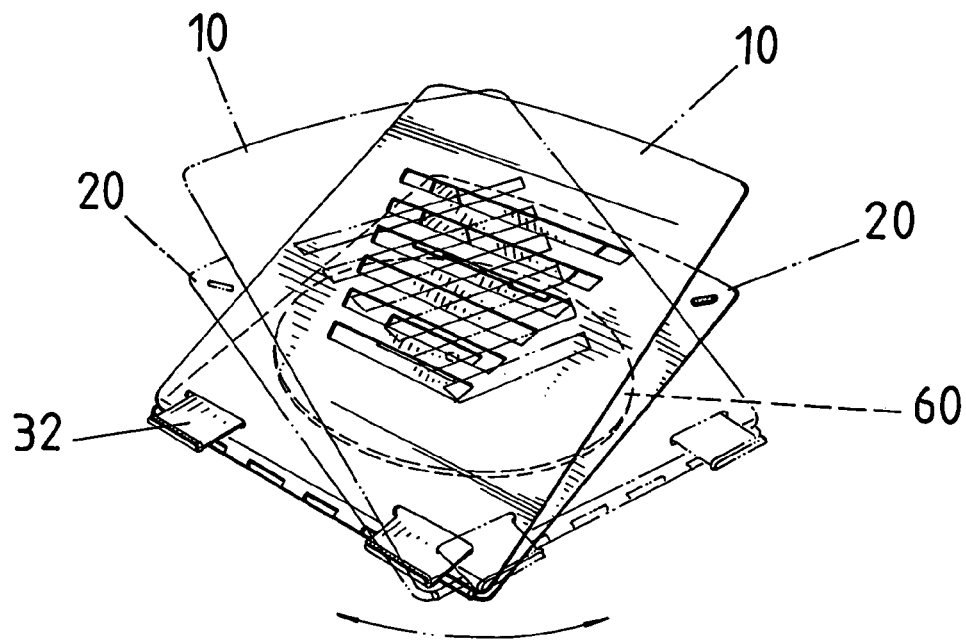
FIG. 6 shows a schematic view of the present invention after being rotated.

Referring to FIG. 6, a bottom of the base plate 20 is pivoted with a turntable 60 which can rotate freely the entire support seat, such that the user can rotate a screen of notebook computer in situ to a front of a client, without moving the support seat.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A notebook computer support seat which can be conveniently folded and carried, comprising a front plate, which provides for a placing of a notebook computer, and which is provided with at least one through-hole; a base plate, an end of which is pivoted with the front plate, and the other end of which is provided with a plurality of rows of insertion holes; a support arm, which is pivoted on the base plate, and an end of which is provided with at least one support piece which are transfixed into the through-hole of front plate to be exposed for supporting the notebook computer; a support plate, an end of which is pivoted at a back of the front plate, and the other end of which is provided with at least one insertion block which is inserted into the insertion hole of base plate; and an interior side of the support plate being provided with another inner support plate which is coaxial with the support plate, with a bottom of the inner support plate being provided with at least one insertion block to be inserted into any set of insertion holes of the base plate for decreasing a tilting angle of the front plate and the notebook computer; the aforementioned support seat being folded into a plane shape to facilitate being placed in a suitcase with the notebook computer, for carrying.

2. The notebook computer support seat which can be conveniently folded and carried, according to claim 1, wherein the front plate is pivoted with the base plate by a hinge.

3. The notebook computer support seat which can be conveniently folded and carried, according to claim 1, wherein the support arm is pivoted on the base plate by a hinge.

4. The notebook computer support seat which can be conveniently folded and carried, according to claim 1, wherein the support plate is pivoted at a back of the front plate by a hinge.

5. The notebook computer support seat which can be conveniently folded and carried, according to claim 1, wherein the base plate is provided with an elastic tightening rope which sheathes the front plate in folding, and which serves as a slide-proof cushion while not in use.

6. The notebook computer support seat which can be conveniently folded and carried, according to claim 1, wherein sides of insertion blocks of the support plate are provided with wings which are used to block the support piece of support arm, when they are laid in flat.

7. The notebook computer support seat which can be conveniently folded and carried, according to claim 1, wherein the support arm is provided with at least one notch to provide for a collection of transmission lines.

8. The notebook computer support seat which can be conveniently folded and carried, according to claim 1, wherein an outer rim of the support piece of support arm is sheathed with an oil seal ring to prevent from sliding.

9. The notebook computer support seat which can be conveniently folded and carried, according to claim 1, wherein a bottom of the base plate is pivoted with a turntable which rotates freely the entire support seat.

* * * * *